United States Patent [19]

Buie et al.

[11] Patent Number: 5,295,387

[45] Date of Patent: Mar. 22, 1994

[54] ACTIVE RESISTOR TRIMMING OF ACCELEROMETER CIRCUIT

[75] Inventors: Jack V. Buie; Gerald R. Yost, both of Kokomo, Ind.

[73] Assignee: Delco Electronics Corp., Kokomo, Ind.

[21] Appl. No.: 855,967

[22] Filed: Mar. 23, 1992

[51] Int. Cl.⁵ .............................................. G01P 21/00
[52] U.S. Cl. ............................................................ 73/1 D
[58] Field of Search ................. 73/1 D, 1 DV, 517 R, 73/2

[56] References Cited

U.S. PATENT DOCUMENTS

| | | |
|---|---|---|
| 1,611,219 | 12/1926 | Minninger . |
| 2,011,774 | 8/1935 | Paulin ..................... 73/151 |
| 2,198,278 | 4/1940 | VanDerHeiden ............ 264/1 |
| 2,244,417 | 6/1941 | Bacon ..................... 235/91 |
| 2,926,898 | 3/1960 | Taylor ..................... 264/1 |
| 3,440,603 | 4/1969 | Cochran ................... 340/52 |
| 3,899,695 | 8/1975 | Solomon et al. ........... 73/727 |
| 4,342,227 | 8/1982 | Petersen et al. .......... 73/517 R |
| 4,622,856 | 11/1982 | Binder et al. ............ 73/727 |
| 4,678,889 | 7/1987 | Yamanka ................. 219/121.69 |
| 4,691,568 | 9/1987 | Rendek .................. 73/517 R |
| 5,233,871 | 8/1993 | Schwarz et al. .......... 73/517 R |

OTHER PUBLICATIONS

N. H. Clark, "An Improved Method for Calibrating Reference Standard Accelerometers", Apr. 1983, pp. 103–107.

Primary Examiner—Hezron E. Williams
Assistant Examiner—Nashmiya Ashraf
Attorney, Agent, or Firm—Mark A. Navarre

[57] ABSTRACT

A micromachined accelerometer unit and a hybrid accelerometer circuit for processing a signal from the unit are mounted in the same package with the substrate of the hybrid circuit in a plane normal to the sensitivity axis of the accelerometer. For calibration, thick film resistors on the substrate are laser trimmed at two different temperatures in two stations. The package is mounted on a shaker table with the substrate normal to the direction of vibration and a trimming laser beam normal to the substrate is directed onto the substrate to trim the resistors while the package is being vibrated. The ac signal produced by the circuit is monitored by test equipment and compared to a reference value to determine any signal error and to control the laser beam. The laser beam has a finite range where the depth of focus is suitable for resistor trimming and the amplitude of vibration is much smaller than that range to permit trimming during the mechanical excitation. Alternatively, the amplitude of vibration is larger than the depth of focus and the operation of the laser is synchronized with the motion of the substrate to turn on the laser only when the resistor being trimmed is within the range of the depth of focus.

11 Claims, 2 Drawing Sheets

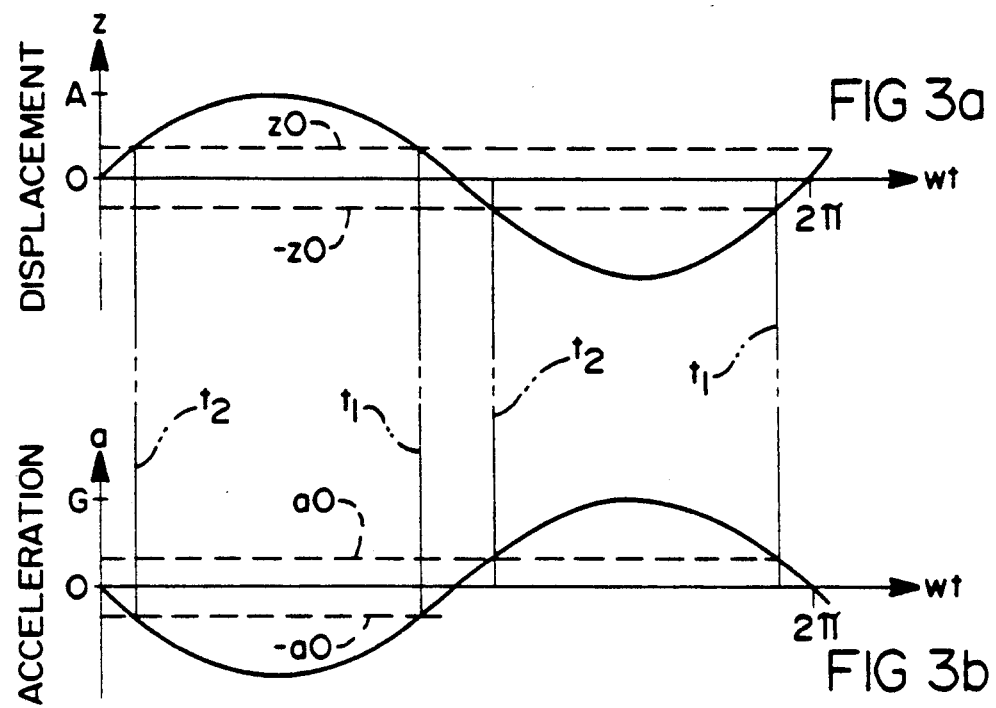
FIG 3a
FIG 3b
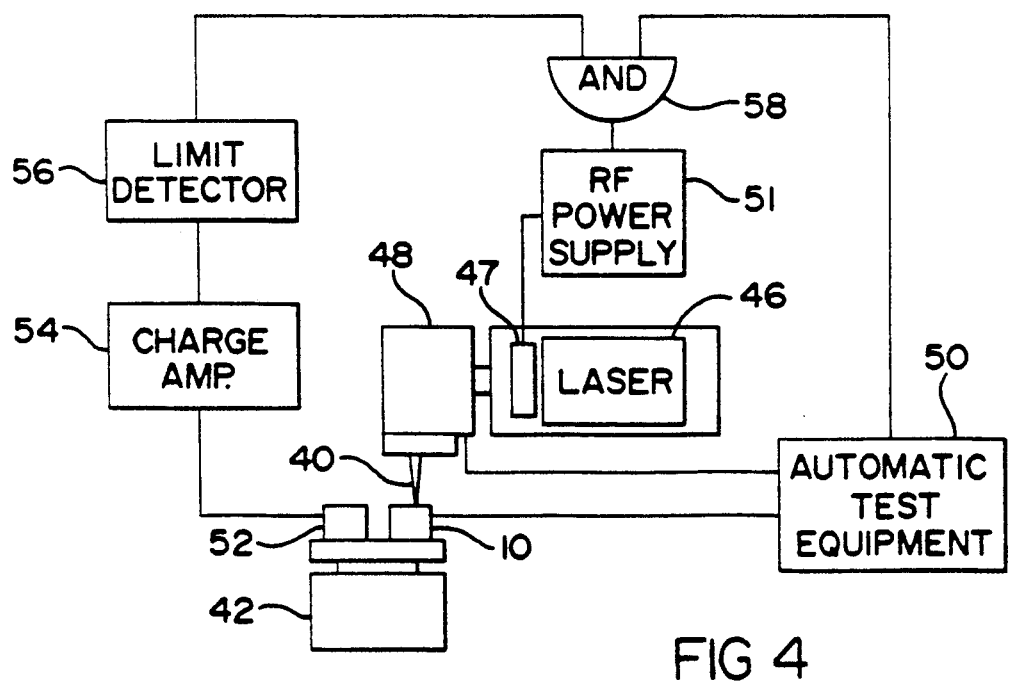
FIG 4

ACTIVE RESISTOR TRIMMING OF ACCELEROMETER CIRCUIT

FIELD OF THE INVENTION

This invention relates to the manufacture of microaccelerometers and, particularly, to a method of calibrating an accelerometer circuit.

BACKGROUND OF THE INVENTION

An accelerometer is one of the primary sensors used in on-board automotive safety control systems and navigational systems, particularly crash sensing systems. Examples of such automotive applications include anti-lock braking systems, active suspension systems, supplemental inflatable restraint systems such as air bags, and seat belt lock-up systems. An accelerometer is a device which measures acceleration or, more accurately, accelerometers measure the force that is exerted by a proof mass as a result of a change in the velocity of the mass.

In a micromachined accelerometer employing oppositely disposed piezoresistive microbridges supporting the proof mass, acceleration causes compressive or tensile load on portions of the microbridges. In turn, the resulting compressive or tensile loads change electrical resistance of piezoresistors in the microbridges. This change in resistance can be sensed to determine the magnitude of the acceleration or component of the acceleration along an axis normal to the plane of the bridges. An accelerometer circuit connected to the piezoresistors processes signals affected by the resistance change to produce an output voltage which is proportional to the acceleration along that axis.

It is desirable to package the accelerometer and the accelerometer circuit together and interconnect them by electrical leads. The circuit typically comprises an alumina substrate supporting a hybrid circuit including thick film resistors which determine the circuit parameters. During manufacture, the circuit parameters are initially set to obtain an approximately correct signal for a given acceleration; however, the circuit is temperature sensitive. A functional calibration is made at two different temperatures by applying a test acceleration and trimming resistors on the accelerometer circuit to yield the desired output at each temperature. In the past, this calibration has been accomplished at each temperature by accelerating the package at a specified rate and measuring the output of the circuit at a test station, transferring the package to a trimming station, laser trimming the resistor by a calculated amount to hopefully correct any error in the output, and repeating the acceleration and measurement to verify that the trimming was sufficient. If not, further trimming and testing ensue. The process of test, transfer, trim, transfer, test, etc., is time consuming and expensive.

In the past, it has been known to functionally calibrate other types of electronic devices, such as pressure sensors, by laser trimming the resistors at the same time the pressure or other parameter is applied so that the testing and verification are coincident, that is, for a given temperature, the resistor trimming progresses until the desired value is attained and no further verification is required, and the process is repeated at another temperature. In the case of accelerometers, such simplicity of calibration has not heretofore been realized due to the difficulty of simultaneously mechanically exciting the package and trimming the resistors.

SUMMARY OF THE INVENTION

It is, therefore, an object of the invention to provide a method of calibrating an accelerometer circuit during mechanical excitation of the accelerometer package.

The invention is carried out by the method of calibrating an accelerometer circuit wherein a package incorporates an accelerometer for sensing acceleration along an axis and an accelerometer circuit having a substrate normal to the axis and thick film resistors on the substrate, comprising the steps of: inducing a known acceleration on the accelerometer by vibrating the package in a direction parallel to the axis; supplying power to the circuit; measuring the circuit output voltage; trimming resistors on the substrate while the package is vibrating by directing a lager beam in the same direction as the direction of vibration to cut portions of the resistors; and controlling the laser beam to trim resistors in accordance with values of the measured voltages.

BRIEF DESCRIPTION OF THE DRAWINGS

The above and other advantages of the invention will become more apparent from the following description taken in conjunction with the accompanying drawings wherein like references refer to like parts and wherein:

FIGS. 3a and 3b are graphs which together show the relationship of displacement and acceleration of a vibrated test part; and FIG. 4 is a schematic diagram of apparatus for calibrating an accelerometer circuit according to the method of a second embodiment of the invention.

DESCRIPTION OF THE INVENTION

Figure 1:
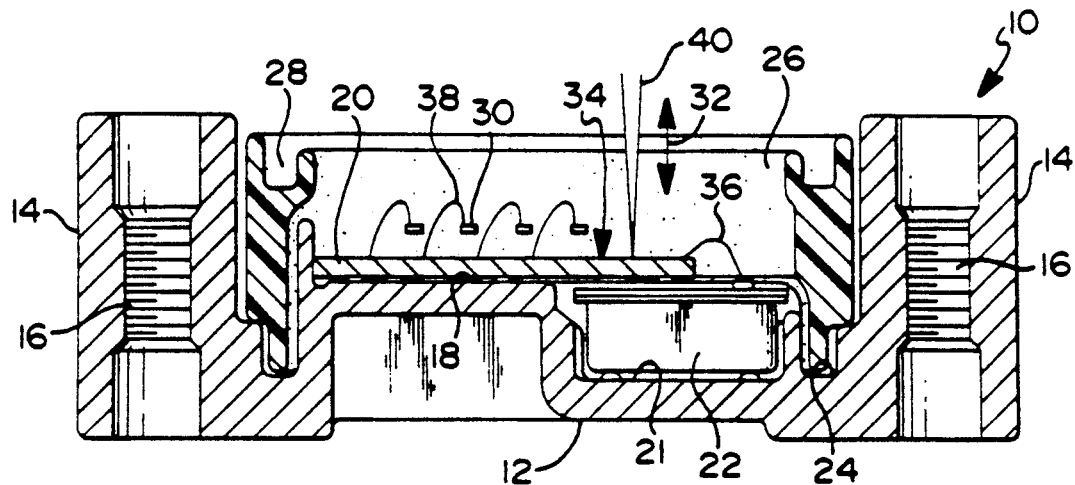
FIG. 1 is a cross section of an accelerometer package containing a circuit for calibration according to the method of the invention.

FIG. 1 shows an accelerometer package 10 having a die-cast aluminum base 12 which includes a mounting structure 14 at each end. Each mounting structure 14 has a threaded bore 16 for securing the package to an appropriate structure in a vehicle. Between the mounting structures, the base 12 has an elevated table surface 18 for supporting an alumina substrate 20 and a well 21 for receiving a microaccelerometer unit 22. A trough 24 surrounds the table surface 18 and the well 21 to provide a seat for a generally rectangular glass filled polyester housing 26 which is open at the top and bottom and which is adhesively secured in the trough. The upper rim of the housing 26 has a groove 28 for receiving an edge flange of a cover (not shown) which is added to the structure after calibration. A plurality of blades 30 extending through one wall of the housing 26 serve as electrical terminals of the package 10. The accelerometer unit 22 is adhesively secured to the floor of the well 21 and comprises a metal can containing the microaccelerometer which is positioned so that its sensitive axis, indicated by arrow 32, is normal to the plane of the substrate 20. The substrate 20 secured to the table surface 18 extends partially over the accelerometer 22. The substrate 20 carries integrated circuits and thick film circuitry including trimmable thick film resistors for circuit calibration, and together comprise a hybrid accelerometer circuit 34. Wire leads 36 couple the accelerometer 22 to the circuit 34, and additional leads 38 couple the circuit 34 to the terminal blades 30. In operation, when electrical power is supplied to certain of the terminals 30, the accelerometer 22 responds to any acceleration along the axis 32 and produces signals on leads 36 which are processed by the accelerometer circuit 34 to produce output signals on certain other of the terminals 30. The output signal is proportional to the component of acceleration which is parallel to the axis 32. To assure that the signal is accurate and is compensated for temperature effects, the thick film resistors of the circuit are trimmed. To trim the circuit 34, a laser beam 40 is directed normal to the substrate 20 through the open housing.

Figure 2:
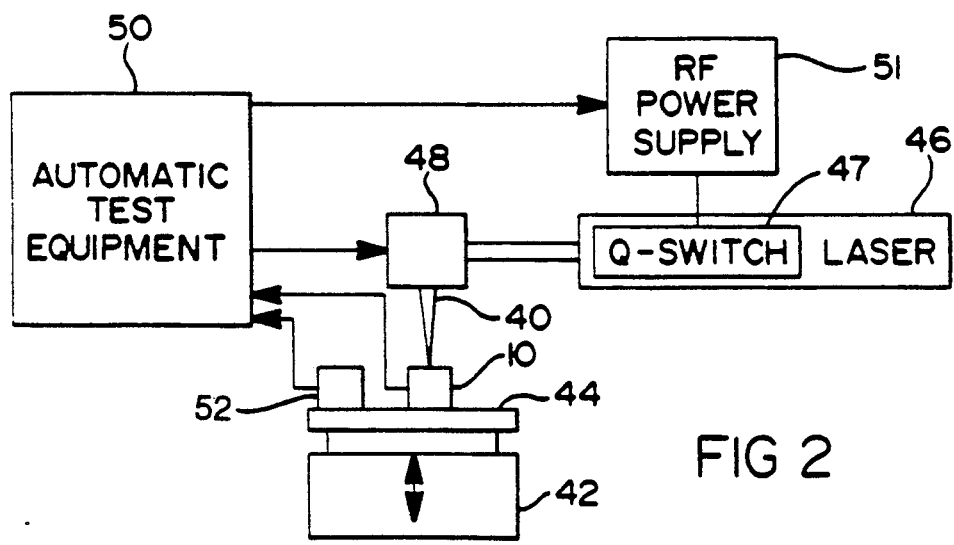
FIG. 2 is a schematic diagram of apparatus for calibrating an accelerometer circuit according to the method of the invention.

Apparatus for trimming the resistors of the accelerometer circuit 34 is shown in FIG. 2. A shaker table 42 for providing vibration in the vertical direction has a horizontal upper work surface 44 provided with clamps (not shown) for holding an accelerometer package 10 with its sensitivity axis 32 vertical, so that the vibration will be in the direction of the axis 32 and normal to the plane of the substrate 20. A laser 46 controlled by a Q-switch 47 supplies a beam 40 for trimming resistors in the package 10, and a beam positioner 48 directs the beam to the resistor to be trimmed and controls its path. Because the vibration is normal to the substrate, there will be no lateral excursion of the substrate to interfere with the correct positioning of the beam.. An RF power supply 51 energizes the Q-Switch 47. Automatic test equipment 50 controls the laser 46 via the power supply 51 and the Q-switch 47, and also controls the beam positioner 48 and the shaker table 42. The test equipment 50 is coupled to the accelerometer circuit 34 via the terminal blades 30 of the accelerometer package 10. The laser trim system excluding the shaker table is a Chicago Laser System model CLS-77, for example.

The shaker table 42 is commercially available apparatus, such as Ling Dynamic Systems vibrator model V721, for vibrating in a generally sinusoidal manner and includes a standard accelerometer 52 for measuring the actual acceleration and a control for governing the actual acceleration to a chosen value. The shaker table also is controllable with respect to vibration amplitude and frequency. Since the laser beam has a finite depth of focus or depth of field where the beam is sufficiently focused for resistor trimming, it is very important that the vibration amplitude be sufficiently small to maintain the substrate within the effective cutting range of the laser during the calibration or that the laser operation be limited to those periods where the substrate is within the range of the depth of focus.

In operation of the trimming apparatus, one or two accelerometer packages 10 are clamped to the table and the table vibration begins under control of the test equipment 50. The equipment 50 supplies a bias voltage to the circuit 34 and receives the acceleration signal from the circuit 34. The signal is sinusoidal since the vibration is harmonic. The test equipment measures the voltage and compares it to a preset target value corresponding to the preset acceleration. Where the desired gain of the accelerometer circuit is 78 mv/g, for example, the target value will be 780 mv for a test acceleration of 10 g's. When there is any error, the equipment controls the laser and the positioning head to trim the is proper resistor until the error is removed. Due to the vertical alignment of the accelerometer axis during calibration, the output is affected by the acceleration due to gravity. To compensate for that, a 1 g offset is included in the preset acceleration. It will be apparent that the offset due to gravity could have been avoided by mounting the package with the sensitive axis in the horizontal plane and exciting the accelerometer horizontally. Because the mechanical excitation is vibrational and the measured signal is ac, no zero adjust is necessary to the calibration. Rather, the rms value of the signal is used to compare to the target value.

If two packages are under calibration, the beam positioner shifts the beam 40 to the second package to repeat the process until the error is removed from that package. Then the laser and the shaker table are stopped by the test equipment and the packages are removed and sent to another calibration station for recalibration at another temperature. Typical test temperatures are room temperature and 85° C.

A laser which has been successfully employed in the practice of this calibration method is a ND:YAG laser with an acoustic-optic Q-switch, having a 38-44 μm spot size, a wavelength of 1.06 μm, and a focal depth of 1.39 mm. The mechanical excitation provided by the shaker table had a displacement of 0.172 mm peak-to-peak, a frequency of 150 Hz and an acceleration level of 10 g's. Note that the vibration amplitude or displacement is small relative to the focal depth of the laser beam and trimming can theoretically occur anywhere in the range of the substrate motion. It is preferred, however, to operate only in the center 20 percent of the laser focal range to allow for variations that occur in the process and guarantee that good laser cuts will result. In this case, the 20 percent range is 0.278 mm, which is still greater than the amplitude of vibration. The pulse rate of the laser is much greater than the vibration frequency so that trimming pulses occur throughout the vibration cycle.

In some applications, it may not be feasible to maintain the substrate motion within the central range of the depth of focus. Suppose that the part is to be tested at 50 Hz and 10 g, and the effective laser depth of focus is 0.278 mm. From the equations for harmonic motion $z = A\sin(wt)$, and $a = -Aw^2 \sin(wt)$, where z is displacement along the axis of vibration, a is the corresponding acceleration, and A is the amplitude of the harmonic motion, it can be determined that the amplitude A must be 0.99 mm for the stated conditions. To limit the cutting to the preferred central focal range, the laser blasts must only occur when the resistor being trimmed is in that range.

The graphs of FIGS. 3a and 3b show the relationship of the displacement sine curve and the acceleration sine curve where G is the maximum acceleration amplitude 10g. This relationship allows correlating the measured acceleration to the substrate displacement. At any given time, the displacement z and the acceleration a are proportional such that $z/a = -A/G$ and thus the displacement can be tracked by monitoring the acceleration a which is available from the standard accelerometer. The limits of the cutting range $+/-z_0$ are equivalent to acceleration limits $a_0 = +/-z_0 G/A$ or $+/-1.4$ g for $z_0 = +/-0.139$ mm. Thus, by limiting the laser operation to the near zero crossing region of the displacement curve as ascertained by the output of the standard accelerometer on the shaker table, the laser cutting will take place only in the center of the laser focal range or between the times $t_1$ and $t_2$ when the acceleration signal is between the thresholds $+z_0$ and $-z_0$. All this assumes that the laser apparatus is set up with the depth of focus centered at the center of the range of displacement, or substantially so.

An apparatus for carrying out the laser trim limited to the near zero crossing is depicted in FIG. 4, which includes all the apparatus of FIG. 2, and has additional circuitry coupled to the standard accelerometer 52. In particular, a charge amplifier 54 connected to the output of the accelerometer 52 has its output coupled to a limit detector 56 for producing an output when the acceleration is within the limits $+/- z_0$. If the charge amplifier has an output of 100 mv/g, the limits of the detector will be set at $+/- 140$ mv for the above example. The output of the limit detector 56 is input to an AND gate 58 which also has an input from the automatic test equipment 50. The AND gate output is connected to an RF power supply 51 which controls the Q-switch 47. Thus, if the test equipment 50 determines that resistor trimming is necessary and the limit detector determines that the resistor is within the required center region of the focal range, the AND gate will be energized to trigger the Q-switch to turn on the laser beam for resistor trimming as long as both conditions are satisfied.

It will thus be seen that the subject calibration method permits active functional calibration of an accelerometer which simplifies testing and reduces part handling by simultaneously measuring acceleration signals and trimming the accelerometer circuit so that a separate verification step and further trimming are not required.

The embodiments of the invention in which an exclusive property or privilege is claimed are defined as follows:

1. The method of calibrating an accelerometer circuit of a package that incorporates an accelerometer for sensing acceleration along an axis, the accelerometer circuit having a substrate normal to the axis and thick film resistors on the substrate for calibrating an output signal corresponding to the sensed acceleration, comprising the steps of:
   inducing a known acceleration on the accelerometer by cyclically displacing the package in a direction parallel to said axis;
   supplying power to the circuit;
   measuring the output signal of the accelerometer circuit;
   trimming said thick film resistors while the package is being cyclically displaced by directing a laser beam in the direction of said displacement to cut portions of said thick film resistors; and
   controlling the laser beam to trim said thick film resistors in accordance with the measured output signal.

2. The invention as defined in claim 1 wherein the laser beam has a depth of focus which is larger than the displacement of the package so that the thick film resistors continuously remain in an effective cutting range of the laser during the cyclic displacement.

3. The invention as defined in claim 1 wherein the step of inducing a known acceleration comprises:
   measuring the induced acceleration by a standard accelerometer; and
   controlling the cyclic displacement to produce said known acceleration.

4. The invention as defined in claim 1 including heating the package to first one temperature and then a second temperature; and
   trimming the accelerometer circuit at each temperature.

5. The invention as defined in claim 1 wherein the laser beam has a depth of focus which is smaller than the displacement of the package, including the step of synchronizing the laser beam with the displacement so that the laser beam is on only when the thick film resistor being trimmed is within the depth of focus of the laser beam.

6. The invention as defined in claim 1 wherein the laser beam has a depth of focus which is smaller than the displacement of the package including the steps of:
   turning on the laser beam when a thick film resistor being trimmed is within the depth of focus of the laser beam; and
   turning off the laser beam when the thick film resistor being trimmed is outside the depth of focus of the laser beam.

7. The invention as defined in claim 1 wherein the laser beam has a depth of focus which is smaller than the displacement of the package including the steps of:
   cyclically displacing a standard accelerometer with said package incorporating the accelerometer being calibrated;
   measuring an actual acceleration with said standard accelerometer;
   correlating said actual acceleration to the displacement of the substrate; and
   controlling the laser beam as a function of said actual acceleration so as to turn on the beam only when the thick film resistor being trimmed is within the depth of focus of the laser beam.

8. The invention as defined in claim 7 wherein the step of controlling the laser beam comprises the steps of:
   centering the depth of focus of the laser beam on said substrate at a midpoint of its cyclic displacement;
   determining limits of the depth of focus above and below said substrate along said axis;
   determining positive and negative acceleration values corresponding to said limits of the depth of focus; and
   turning the laser beam on only when said actual acceleration is between the determined acceleration values.

9. The method of calibrating an accelerometer circuit of a package that incorporates an accelerometer for sensing acceleration along an axis, the accelerometer circuit having a substrate normal to the axis, trimmable thick film calibration resistors on the substrate, and circuit output terminal for providing an output signal corresponding to the sensed acceleration, comprising the steps of:
   supplying power to the circuit;
   mechanically exciting the accelerometer by shaking the package in a direction parallel to the axis;
   measuring the output signal providing at said output terminal;
   directing a laser beam normal to the substrate for trimming said calibration resistors while the package is being mechanically excited; and
   controlling the laser beam to trim said calibration resistors, so as to bring said measured output signal into correspondence with a desired output signal.

10. The invention as defined in claim 9 wherein the package is oriented with said axis parallel to earth's gravitational field and the desired output signal is offset by 1g.

11. The invention as defined in claim 9 wherein the method includes:

calibrating the accelerometer circuit at room temperature to achieve the desired output signal;

heating the accelerometer circuit to an elevated temperature above room temperature; and again calibrating the accelerometer circuit at the elevated temperature to achieve the desired output signal.

* * * * *